(12) United States Patent
Bjerre (10) Patent No.: US 10,949,640 B2
(45) Date of Patent: Mar. 16, 2021

(54) METHOD OF CONTROLLING AN ELECTRONIC DEVICE

(71) Applicant: Fingerprint Cards AB, Gothenburg (SE)

(72) Inventor: Troels Bjerre, Valby (DK)

(73) Assignee: Fingerprint Cards AB, Göteborg (SE)

( * ) Notice: Subject to any disclaimer, the term of this patent is extended or adjusted under 35 U.S.C. 154(b) by 0 days.

(21) Appl. No.: 16/755,664

(22) PCT Filed: Oct. 5, 2018

(86) PCT No.: PCT/SE2018/051021
§ 371 (c)(1),
(2) Date: Apr. 13, 2020

(87) PCT Pub. No.: WO2019/078768
PCT Pub. Date: Apr. 25, 2019

(65) Prior Publication Data
US 2020/0302146 A1  Sep. 24, 2020

(30) Foreign Application Priority Data

Oct. 17, 2017 (SE) ...................................... 1751288

(51) Int. Cl.
| | |
|---|---|
| *G06K 9/00* | (2006.01) |
| *G06F 3/0488* | (2013.01) |
| *G06F 21/32* | (2013.01) |
| *G06K 9/20* | (2006.01) |

(52) U.S. Cl.
CPC ....... *G06K 9/00026* (2013.01); *G06F 3/0488* (2013.01); *G06F 21/32* (2013.01); *G06K 9/0002* (2013.01); *G06K 9/0004* (2013.01); *G06K 9/209* (2013.01)

(58) Field of Classification Search
CPC ............. G06K 9/00026; G06K 9/0002; G06K 9/0004; G06K 9/209; G06K 9/00355; G06F 3/0488; G06F 21/32; G06F 2203/0338; G06F 3/048; G06F 3/0487; G06F 3/03547; G06F 3/01
See application file for complete search history.

(56) References Cited

U.S. PATENT DOCUMENTS

| | | |
|---|---|---|
| 6,408,087 B1 | 6/2002 | Kramer |
| 2005/0012714 A1 | 1/2005 | Russo et al. |
| 2005/0271259 A1 | 12/2005 | Lorch et al. |
| 2008/0240523 A1 | 10/2008 | Benkley et al. |
| 2008/0267465 A1 | 10/2008 | Matsuo et al. |
| 2010/0027854 A1* | 2/2010 | Chatterjee ........... G06F 3/03547 382/124 |
| 2014/0300574 A1 | 10/2014 | Benkley, III et al. |
| 2015/0074615 A1 | 3/2015 | Han et al. |
| 2015/0135108 A1 | 5/2015 | Pope et al. |

OTHER PUBLICATIONS

International Search Report and Written Opinion for International Application No. PCT/SE2018/051021 dated Mar. 11, 2019 (13 pages).

* cited by examiner

*Primary Examiner* — Abhishek Sarma
(74) *Attorney, Agent, or Firm* — RMCK Law Group, PLC (57) ABSTRACT

The present disclosure relates to a method of controlling an electronic device, the electronic device comprising a fingerprint sensor. The present disclosure also relates to a corresponding electronic device and to a computer program product.

15 Claims, 6 Drawing Sheets

METHOD OF CONTROLLING AN ELECTRONIC DEVICE

CROSS-REFERENCE TO RELATED APPLICATIONS

This application is a 371 U.S. National Stage of International Application No. PCT/SE2018/051021, filed Oct. 5, 2018, which claims priority to Swedish Patent Application No. 1751288-0, filed Oct. 17, 2017. The disclosures of each of the above applications are incorporated herein by reference in their entirety.

TECHNICAL FIELD

The present disclosure relates to a method of controlling an electronic device, the electronic device comprising a fingerprint sensor. The present disclosure also relates to a corresponding electronic device and to a computer program product.

BACKGROUND

Various types of biometric systems are used more and more in order to provide for increased security for accessing an electronic device, thereby providing an enhanced user convenience. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important issues.

Typically, the fingerprint sensor is solely used for providing increased security, for example for unlocking the electronic device. However, it may also be possible to use the fingerprint sensor for controlling the X-Y position of a pointer on a display by detecting motion of ridges and pores of a fingerprint of a user and moving the pointer on the display accordingly, and/or for detecting general e.g. "swipe gestures", etc.

An example of such a system is disclosed in U.S. Pat. No. 6,408,087, the system being configured to capture successive images of the fingerprint ridges and pores and detect motion in or changes of the ridges and pores based upon the captured successive images. Specifically, successive images are captured by scanning an array of sensors, each of the sensors being smaller than the width of an individual ridge of a fingerprint. Typically, the array of sensors is smaller than the pad of a finger of a user.

The fingerprint sensing system according to U.S. Pat. No. 6,408,087 provides for an excellent showcase of increased usefulness of a fingerprint sensor by indicating its use in relation to controlling the position of a pointer on a display. However, there appears to be room for further improvement, specifically allowing for further use of the fingerprint sensor when comprised with an electronic device.

SUMMARY

In view of above-mentioned and other drawbacks of the prior art, it is an object of the present disclosure to provide an improved electronic device configured to be at least partly controlled by use of a fingerprint sensor.

According to an aspect of the present disclosure, it is therefore provided a method of controlling an electronic device, the electronic device comprising a display unit configured to display a first graphical user interface (GUI), a first user input device comprising a fingerprint sensor configured to capture a fingerprint image of a finger of a user, and a control unit configured to control the operation of the fingerprint sensor, wherein the method comprises the steps of detecting the user's finger at the first user input device, arranging, in response to the finger being detected, the fingerprint sensor in a reduced information capturing mode, acquiring, when in the reduced information capturing mode, a first and a second partial fingerprint image, and determining, based on the first and the second partial fingerprint image, a level of movement of the finger at the fingerprint sensor, if the level of movement is below a predetermined threshold, arranging the fingerprint sensor in a fingerprint authentication capturing mode, and acquiring, when in the fingerprint authentication capturing mode, a fingerprint image for allowing authentication of the user's finger, if the level of movement is above the predetermined threshold, determining a direction of movement of the finger over the fingerprint sensor based on the first and the second (and possibly further) partial fingerprint image(s).

The present disclosure is based upon the realization that a fingerprint sensor comprised with an electronic device may be specifically adapted for swift user operation both in relation to authenticating and navigating. In accordance to the present disclosure, this is achieved by making us of a determined level of movement of the user's finger over the fingerprint sensor for controlling how user input provided through the fingerprint sensor should be used, for e.g. gesture control within the GUI provided at the display or for authenticating the user.

Typically, in case the user is keeping his finger essentially steady (i.e. an in comparison low level of movement) at the fingerprint sensor, this may be used as an indication that the user wants to use the sensor for authentication, such as for example for unlocking a previously locked electronic device. Conversely, in case it is determined that the user is "moving around" his finger at the fingerprint sensor this may be used as an indication that the user wants to use the fingerprint sensor for allowing user interaction with the GUI based on the determined finger gesture (such as for e.g. in the GUI scrolling/navigating a list of notifications (swipe up/down for scroll and tap to select), changing track on a playlist (swipe left/right), or turning volume up/down, and/or for e.g. controlling the pointer shown at the display as mentioned above).

Furthermore, in accordance to the present disclosure the fingerprint sensor is further controlled in different "capture modes", where an in comparison lower amount of information is captured using the fingerprint sensor when using the fingerprint sensor for controlling e.g. the pointer. This may in some implementations of the present disclosure be achieved by arranging the fingerprint sensor to only capture information from a sub area (or selected portion) of a total active area for the fingerprint sensor. Conversely, when the fingerprint sensor is used for authenticating the user, the fingerprint sensor is adapted to capture an in comparison larger amount of information.

In an alternative embodiment it may be possible to arrange the fingerprint sensor to capture at an in comparison lower resolution fingerprint image when in the reduced information capturing mode (such as e.g. every second pixel in case the fingerprint sensor is arranged as a matrix structure). Correspondingly, when authentication of the user is desired, the fingerprint sensor may be adapted to capture e.g.» using essentially the full potential of the fingerprint sensor (such as capturing using essentially all pixels in regard to the example above).

As would be apparent from the above, advantages with the present disclosure includes simplified user control of the electronic device since the sensor may be used for both authentication and e.g. pointer control/gesture recognition, while at the same time being highly responsive since the directional determination is achieved using fingerprint images comprising less information than what is normally needed for authentication of the user using the fingerprint sensor. Specifically, since a lesser amount of information at each time needs to be processed by the control unit, meaning possibly an increased number of low information images may be processed per each time unit.

In accordance to the present disclosure it may be possible to make further use of the first and the second partial fingerprint image acquired for determining the level of movement. Specifically, the first and the second partial fingerprint image may in a preferred embodiment be used for determining a suitable (optimal) sensitivity setting for fingerprint image capturing (including either or both of software and hardware related settings for the fingerprint sensor). It should however be understood that it in some implementations it may be suitable to also capture further partial fingerprint images for optimizing settings for capturing the fingerprint images. The capturing setting may subsequently be used during capture for both fingerprint authentication or for controlling e.g. the pointer at the display.

According to the present disclosure, the control unit is preferably an ASIC, a microprocessor or any other type of computing device for controlling the operation of the fingerprint sensor. As such, the control unit may form an integral part of the second user input device. However, the control unit may also be a general control unit comprised with the electronic device, for example configured for controlling the overall operation of the electronic device.

The fingerprint sensor may, as indicated above, be implemented using any kind of currently or future fingerprint sensing principles, including for example capacitive, optical, thermal or ultrasonic sensing technology.

Furthermore, navigational control (e.g. pointer) using the fingerprint sensor may possibly be based on a determination of a disposition of ridges, valleys and pores of a fingerprint when analyzing the successively acquired fingerprint images (including the first and the second partial fingerprint images as well as further acquired fingerprint images), and a corresponding movement within the first GUI may be achieved. It could also be possible to operate a "virtual" keyboard using the second user input device.

As mentioned above, the fingerprint sensor is configured to include an array of pixels for generating the fingerprint images. In a possible embodiment the fingerprint sensor is configured to include an array comprising at least 64×80 pixels. Any other differently sized fingerprint sensor is of course possible and within the scope of the present disclosure. Preferably, the fingerprint sensor is capable of detecting surface relief of a finger having a depth of 1 or 2 micrometers or less. In case of applying capacitive sensing technology, each pixel includes a capacitive element and the system captures the fingerprint images by detecting changes in capacitance of the capacitive elements.

In line with the present disclosure, it may be possible to only allow a sub-set of the pixels to be initially active, i.e. when the fingerprint sensor is arranged in the reduced information capturing mode. Accordingly, in the reduced information capturing mode a minor portion of an active area of the fingerprint sensor is typically active. Conversely, when authenticating the user, an in comparison larger area may be used for capturing fingerprint information, such as a major portion of the active area of the fingerprint sensor.

In a possible embodiment of the present disclosure it may be possible to, subsequent to determining the direction of movement of the finger over the fingerprint sensor, determine if the level of movement is below the predetermined threshold, arrange the fingerprint sensor in the fingerprint authentication capturing mode, and acquire, when in the fingerprint authentication capturing mode, a fingerprint image for allowing authentication of the user's finger. Accordingly, if the user has initially "moved around" his finger and thus the direction of movement has been determined, the process may "go back" to instead use the fingerprint sensor for authenticating the user once the user holds his finger essentially steady at the fingerprint sensor (i.e. movement below the predetermined threshold). This will thus allow the process to seamlessly transition between the two states of authentication and e.g. gesture control using the fingerprint sensor. As is apparent, the process works also the other way around, i.e. allowing gesture control to take place subsequent a fingerprint authentication of the finger of the user.

According to another aspect of the present disclosure, there is provided an electronic device, comprising a display unit configured to display a first graphical user interface (GUI), a first user input device comprising a fingerprint sensor configured to capture a fingerprint image of a finger of a user, and a control unit configured to control the operation of the fingerprint sensor, wherein the control unit is configured to detect the user's finger at the first user input device, arrange, in response to the finger being detected, the fingerprint sensor in a reduced information capturing mode, acquire, when in the reduced information capturing mode, a first and a second partial fingerprint image, and determine, based on the first and the second partial fingerprint image, a level of movement of the finger at the fingerprint sensor, if the level of movement is below a predetermined threshold, arrange the fingerprint sensor in a fingerprint authentication capturing mode, acquire, when in the fingerprint authentication capturing mode, a fingerprint image for allowing authentication of the user's finger, if the level of movement is above the predetermined threshold, determine a direction of movement of the finger over the fingerprint sensor based on the first and the second partial fingerprint image. This aspect of the present disclosure provides similar advantages as discussed above in relation to the previous aspect of the present disclosure.

In a possible embodiment of the present disclosure the electronic device is portable and implemented as e.g. a mobile phone, a tablet or a laptop, etc.

According to a further aspect of the present disclosure, there is provided a computer program product comprising a non-transitory computer readable medium having stored thereon computer program means for a control unit adapted for controlling an electronic device, the electronic device comprising a display unit configured to display a first graphical user interface (GUI), a first user input device comprising a fingerprint sensor configured to capture a fingerprint image of a finger of a user, and a control unit configured to control the operation of the fingerprint sensor, wherein the computer program product comprises code for detecting the user's finger at the first user input device, code for arranging, in response to the finger being detected, the fingerprint sensor in a reduced information capturing mode, code for acquiring, when in the reduced information capturing mode, a first and a second partial fingerprint image, and code for determining, based on the first and the second partial fingerprint image, a level of movement of the finger at the fingerprint sensor, if the level of movement is below a predetermined threshold, code for arranging the fingerprint sensor in a fingerprint authentication capturing mode, code for acquiring, when in the fingerprint authentication capturing mode, a fingerprint image for allowing authentication of the user's finger, if the level of movement is above the predetermined threshold, code for determining a direction of movement of the finger over the fingerprint sensor based on the first and the second partial fingerprint image. Also this aspect of the present disclosure provides similar advantages as discussed above in relation to the previous aspects of the present disclosure.

As mentioned above, the control unit is preferably an ASIC, a microprocessor or any other type of computing device. Similarly, a software executed by the control unit for operating the inventive system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Figure 1A:
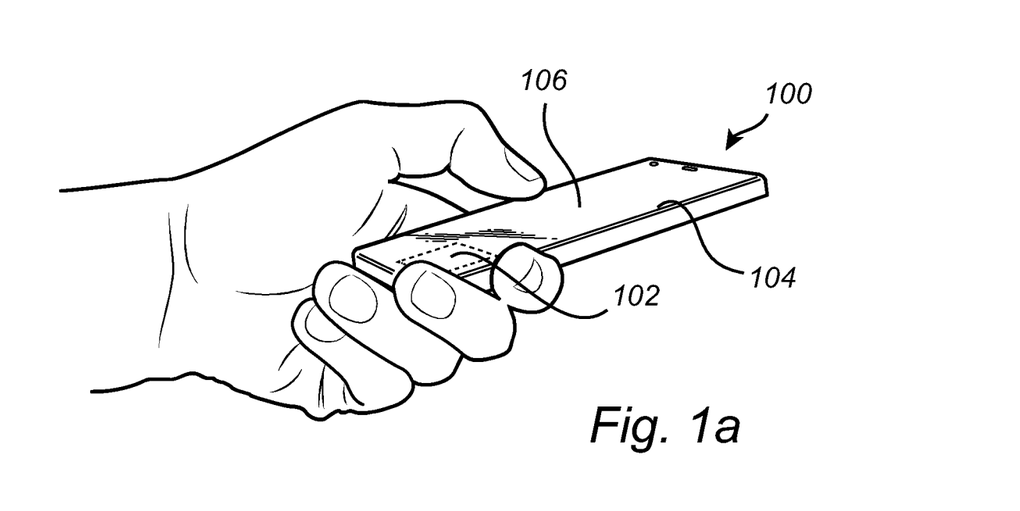
FIGS. 1a and 1b schematically exemplifies embodiment of the electronic device according to the present disclosure, in the form of a mobile phone comprising an integrated fingerprint sensor.

Turning now to the drawings and to FIG. 1a in particular, there is schematically illustrated an example embodiment of the electronic device according to the present disclosure, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone, etc. Further functionality provided using the fingerprint sensor 102 will be discussed below.

Figure 1B:
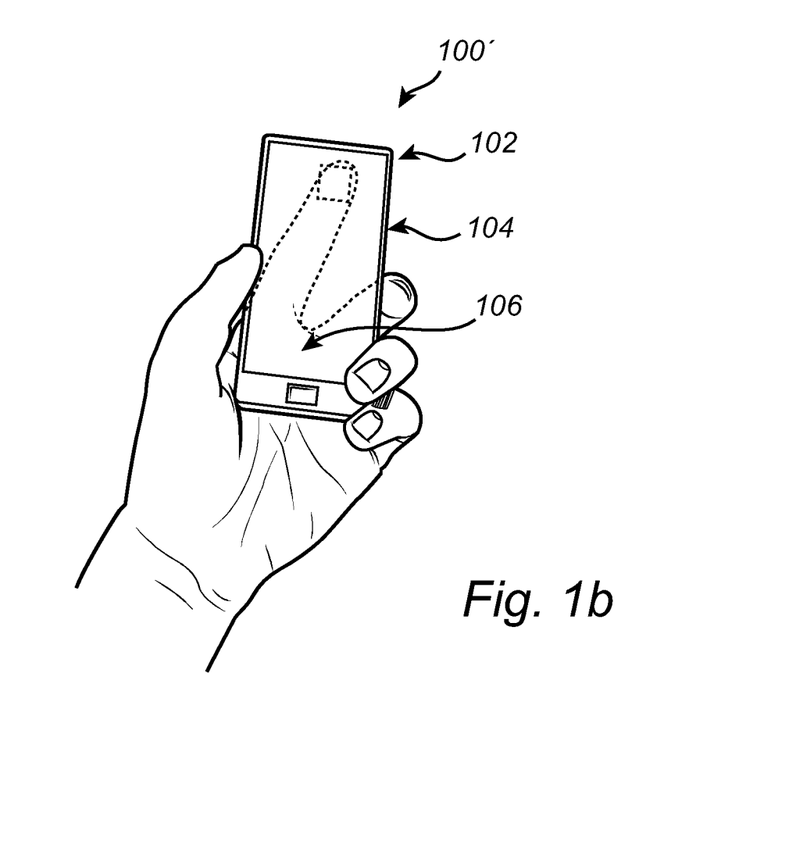

FIG. 1b schematically illustrates an alternative embodiment of the electronic device according to the present disclosure, where the display unit 104 is still arranged at the front side of the mobile phone 100', having the fingerprint sensor 102 alternatively arranged at the backside of the mobile phone 100'. It may of course be possible to allow the fingerprint sensor 102 to in an alternative embodiment (or also) to be side mounted at the mobile phone 100/100'.

Preferably and as is apparent for the skilled person, the mobile phone 100/100' shown in FIGS. 1a and 1b further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the present disclosure may be applicable in relation to any other type of electronic device, such as a laptop, a remote control, a tablet computer, or any other type of present or future similarly configured device.

Figure 2:
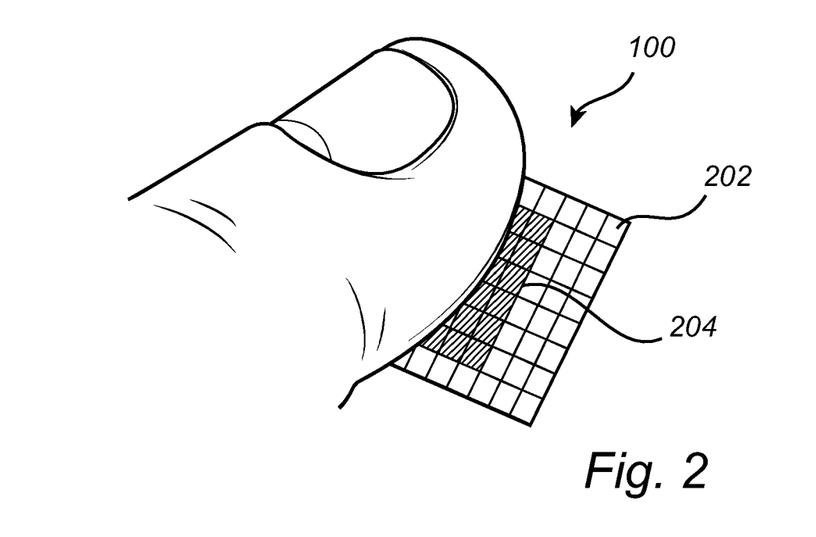
FIG. 2 schematically shows the fingerprint sensor array comprised in the electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The sensing elements may for example be arranged as sets of sensing elements, where such a set for example may comprise 8×8 sensing elements (also denoted as pixels). Such an exemplary set of sensing elements is in FIG. 2 indicated by reference numeral 202.

In an embodiment of the present disclosure, a sub area 204 of the total area of the fingerprint sensor 102 may be defined to comprise a set of sensing elements 202, where the set of sensing elements 202 comprised with the sub area 204 compose a minority of the total area of the fingerprint sensor 102, such as for example less than 50% of all of the sensing elements 202 comprised with the total area of the fingerprint sensor 102. In a possible embodiment the sub area 204 comprises less than 25% or even 10% sensing elements 202 of the total number of sensing elements comprised with the fingerprint sensor 102.

Figure 3:
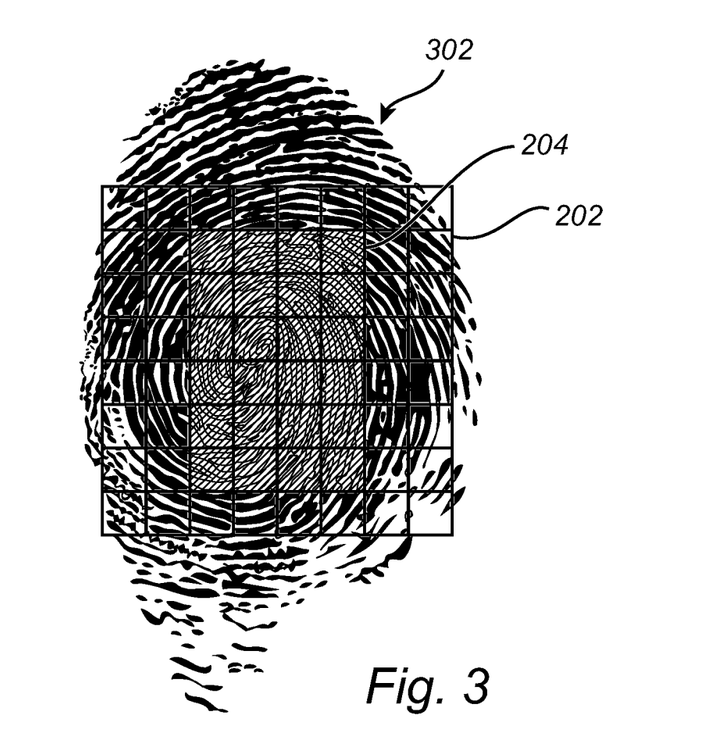
FIG. 3 illustrates an example of a fingerprint image captured using the fingerprint sensor in FIG. 2.

Turning now to FIG. 3 which illustrates an example of a fingerprint image 302 captured using the fingerprint sensor 102. The fingerprint sensor 102 is capable of sensing surface relief of human skin, and will provide a pixel based image for further processing for the purpose of extracting a verification representation to be compared to a pre-stored fingerprint template. For determining a composite direction of movement across the fingerprint sensor 102, the control unit will control the fingerprint sensor 102 to successively capture fingerprint images 302 (comprising the first and the second partial fingerprint images) comprising ridges and valleys of the user's fingerprint. As discussed above, when the fingerprint sensor is arranged in the reduced information capturing mode only the sensing elements 102 comprised with the sub area 204 are "active" and adapted to capture fingerprint data. In FIG. 3 this is illustrated by the darker sections comprised with the fingerprint image 302.

Figure 4:
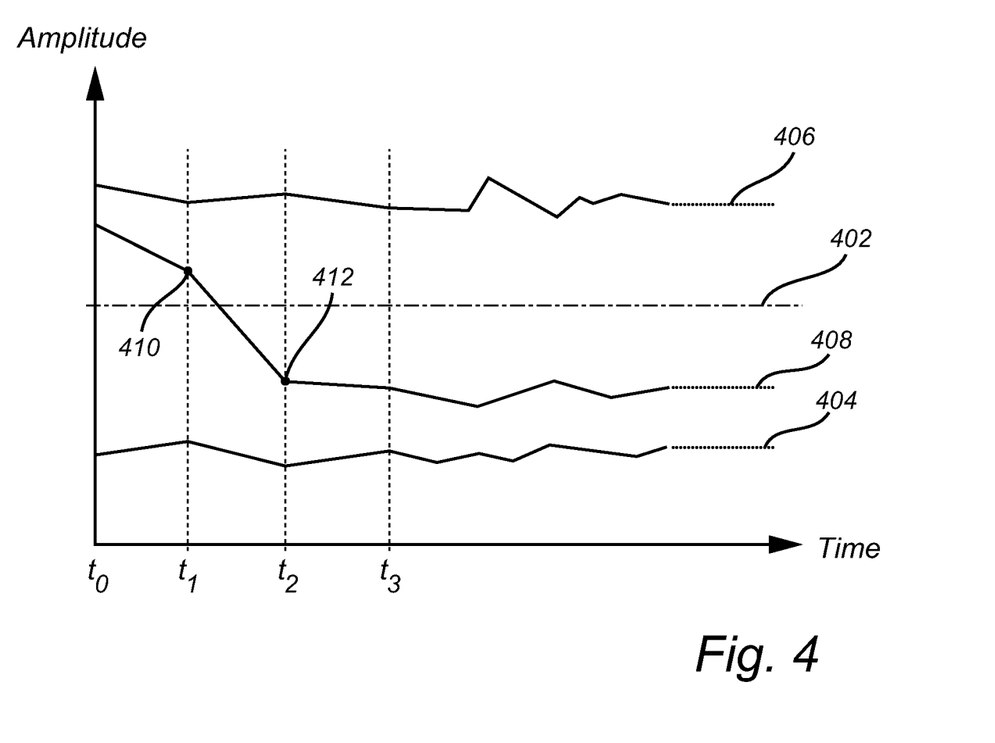
FIG. 4 is a diagram exemplifying a comparison between level of movement over time of the user's finger at the fingerprint sensor in FIG. 2 when compared to a predefined threshold.

In an embodiment of the present disclosure, the control unit will be configured to analyze at least the first and the second partial fingerprint images to determine movement of the fingerprint in X- and Y-directions parallel to a plane defined by the surface of the fingerprint sensor 102. In FIG. 4 there is conceptually illustrated how a level of movement over time may be compared to a predetermined threshold 402. The diagram comprises a first scenario where the user holds his finger steady at the fingerprint sensor 102 and thus generates an in comparison low level of movement over time 404 determined to stay below the predetermined threshold 402. Consequently, the electronic device 100, 100' will arrange the fingerprint sensor in the fingerprint authentication capturing mode for capturing fingerprint images for the authentication phase, where (essentially) all of the sensing elements 202 of the fingerprint sensor 102 are "activated".

In a second scenario the user does not hold his finger steady at the fingerprint sensor 102. Thus, a level of movement over time 406 is determined to stay above the predetermined threshold 402, and a combination of the already captured partial fingerprint images (first and second) as well as further partial fingerprint images captured with the fingerprint sensor 102 in the reduced information capturing mode are used for determining how the finger is moving over the fingerprint sensor 102. For example, control unit may compute X- and Y-displacement values corresponding to the movement of the fingerprint between the fingerprint images captured in the reduced information capturing mode. In turn, the X- and Y-displacement values are used for controlling the operation of the GUI shown on the display unit 104 of the mobile phone 100/100' as further elaborated below in relation to FIGS. 5a-5c.

As is further illustrated in FIG. 4, the concept according to the present disclosure allows for a seamless transition between the "authentication mode" where the fingerprint sensor 102 is arranged on the fingerprint authentication capturing mode, and the "gesture mode" where the fingerprint sensor is arranged in the reduced information capturing mode. An example of such a transition is provided in relation to a changing level of movement over time 408. Specifically, a first point 410 at a time $t_1$ along the changing level of movement 408 exemplifies a situation where the process is to stay in the gesture mode. However, at a second point 412 at a (later) time $t_2$ the level of movement 408 has been reduced such that it falls below the threshold 402, thus transitioning to the process to the authentication mode. The times $t_0$, $t_1$, $t_2$, etc. may be seen as points in time where the fingerprint sensor is arranged in the reduced information capturing mode for capturing a partial fingerprint image.

Figure 5A:
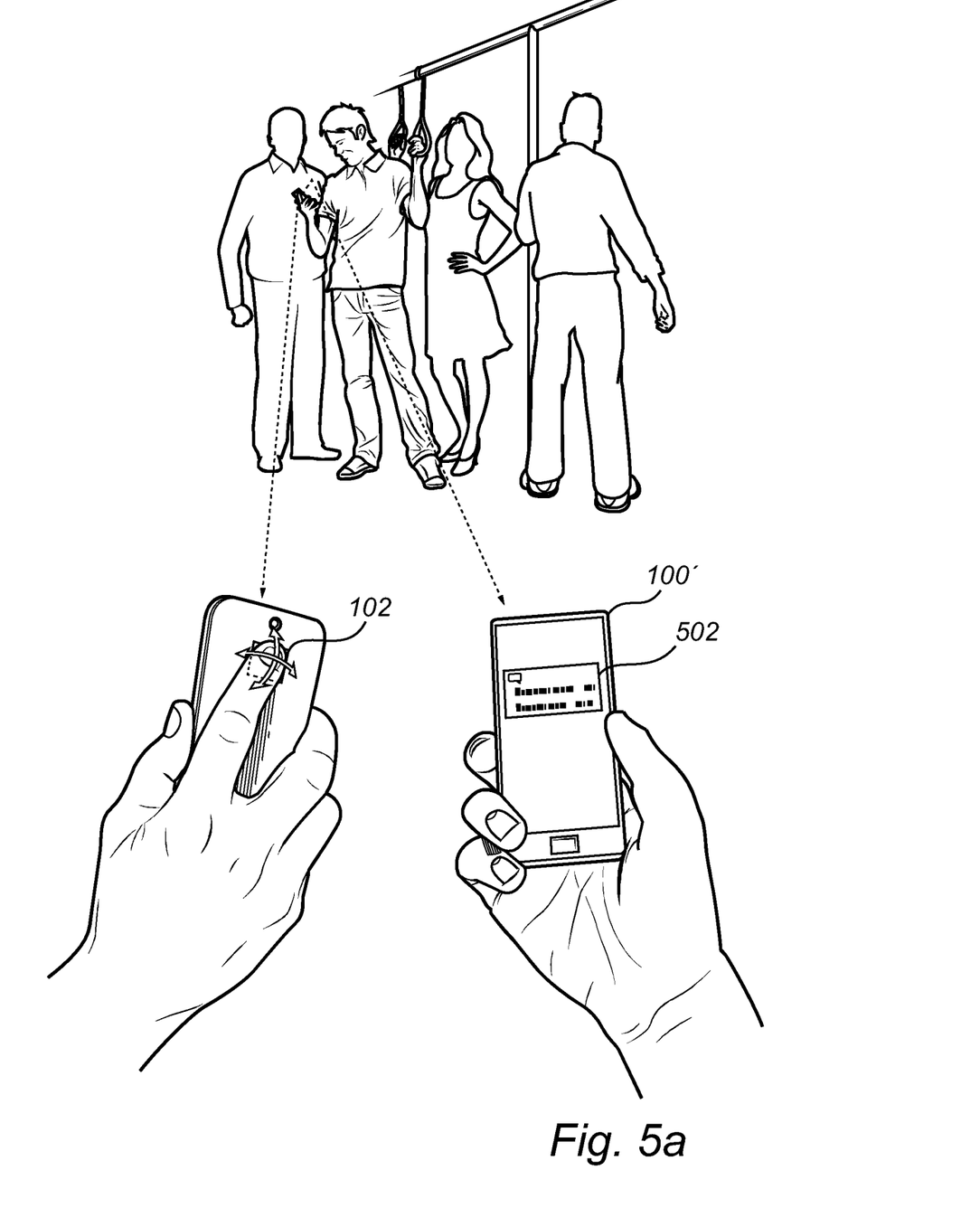
FIGS. 5a-5c illustrates possible embodiments of GUI control using a fingerprint sensor.
Figure 5B:
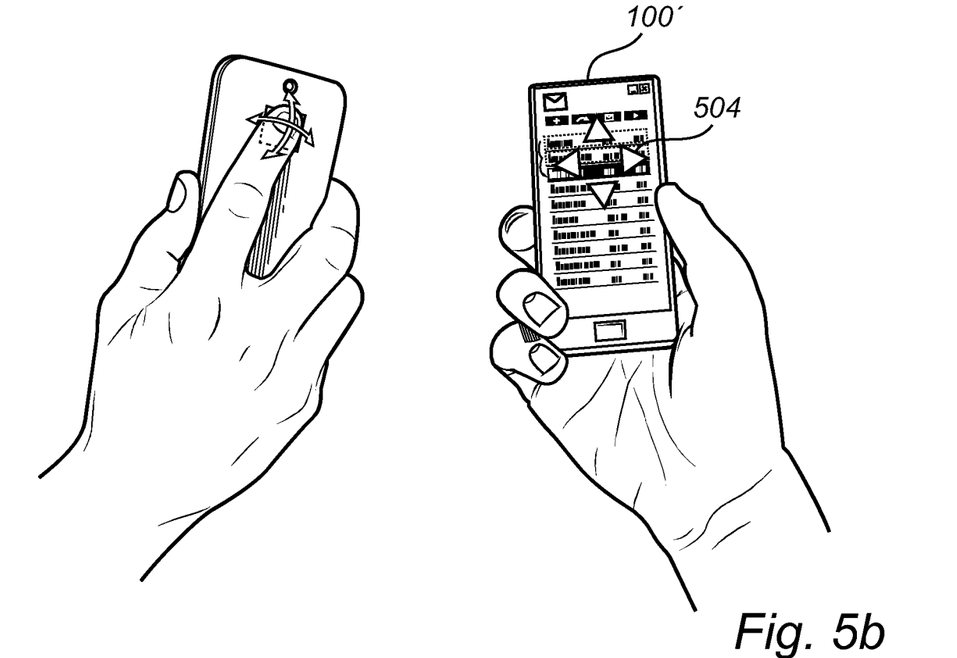
Figure 5C:
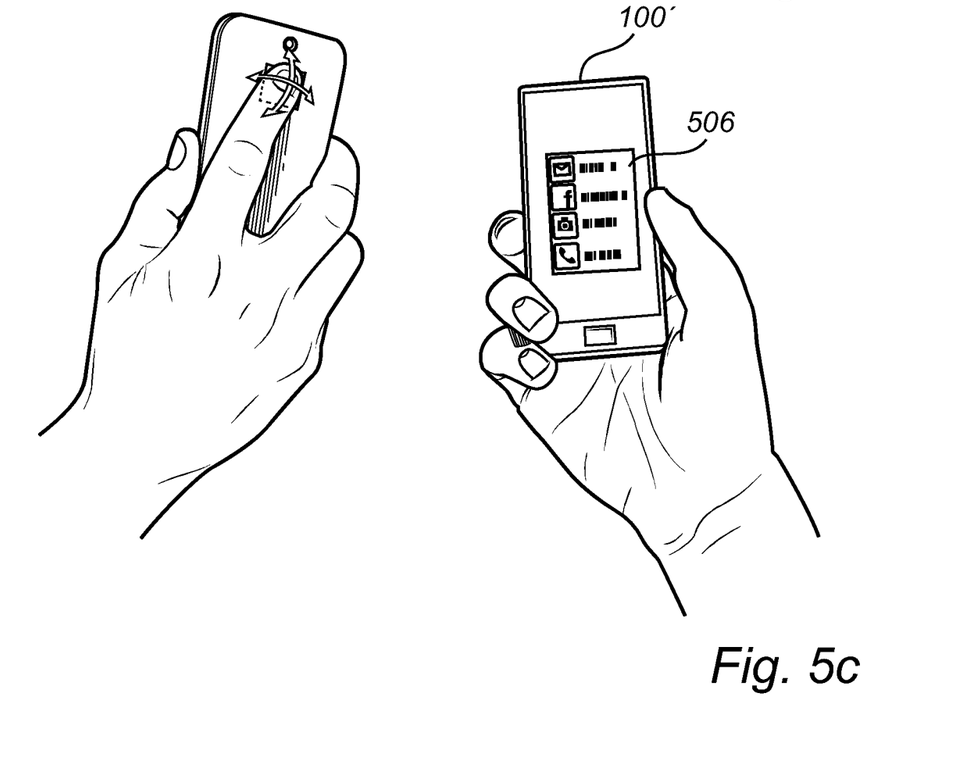

FIGS. 5a-5c provide examples of controlling the GUI using the fingerprint sensor 102, by the user moving his finger over the surface of the fingerprint sensor 102. In the exemplified embodiment specifically shown in FIG. 5a, the user is in a situation where a "one hand" control of the mobile phone 100' is desirable, and hence the fingerprint sensor is preferably arranged at the back of the mobile phone 100'. In this embodiment (FIG. 5a), the exemplified GUI shows a so called "lock screen" of the mobile phone 100' in a "locked mode", i.e. typically being a state where the user has not yet been authenticated (e.g. using the fingerprint sensor 102). Accordingly, the typical GUI control in such a scenario may for example be provided with e.g. notifications 502 etc. that may be accessed by the user while the mobile phone 100' is still in the locked mode. The user may then be allowed to use the methodology in accordance to the present disclosure for e.g. scrolling/navigating the list of notifications (swipe up/down for scroll and tap to select). The GUI could alternatively be related to e.g. a music application adapted to play music by means of the mobile phone 100'. Correspondingly, the user may then be allowed to use the methodology in accordance to the present disclosure for e.g., changing track on a playlist (swipe left/right), or turning volume up/down, etc.

Alternatively, with reference to FIG. 5b, in relation to another application, comprising a GUI comprising e.g. navigation arrows for operating functions comprised with such a GUI. The navigation arrows may be explicitly visualized as GUI overlay within the application. However, the functionality of using navigation arrows may also be implicit, such as stepping through a list 504 of e.g. notifications or similar. In any case, the implicit navigation of the list 504 or the explicit connection with the navigation arrows is provided by movement of the finger over the fingerprint sensor 102 as discussed above.

In a further embodiment of the present disclosure as shown in FIG. 5c, once it has been decided that the second user input device comprising the fingerprint sensor 102 should be used for controlling the GUI, it may also be possible to visualize a second GUI 506 specifically adapted for control using the fingerprint sensor 102. Such a second GUI 506 may be provided separately within a specifically adapted application for example comprising a short list of links to other frequently used applications (e.g. a Facebook app, a camera app, a caller app), where the methodology in accordance to the present disclosure may be used for e.g. scrolling within the short list of links.

Figure 6:
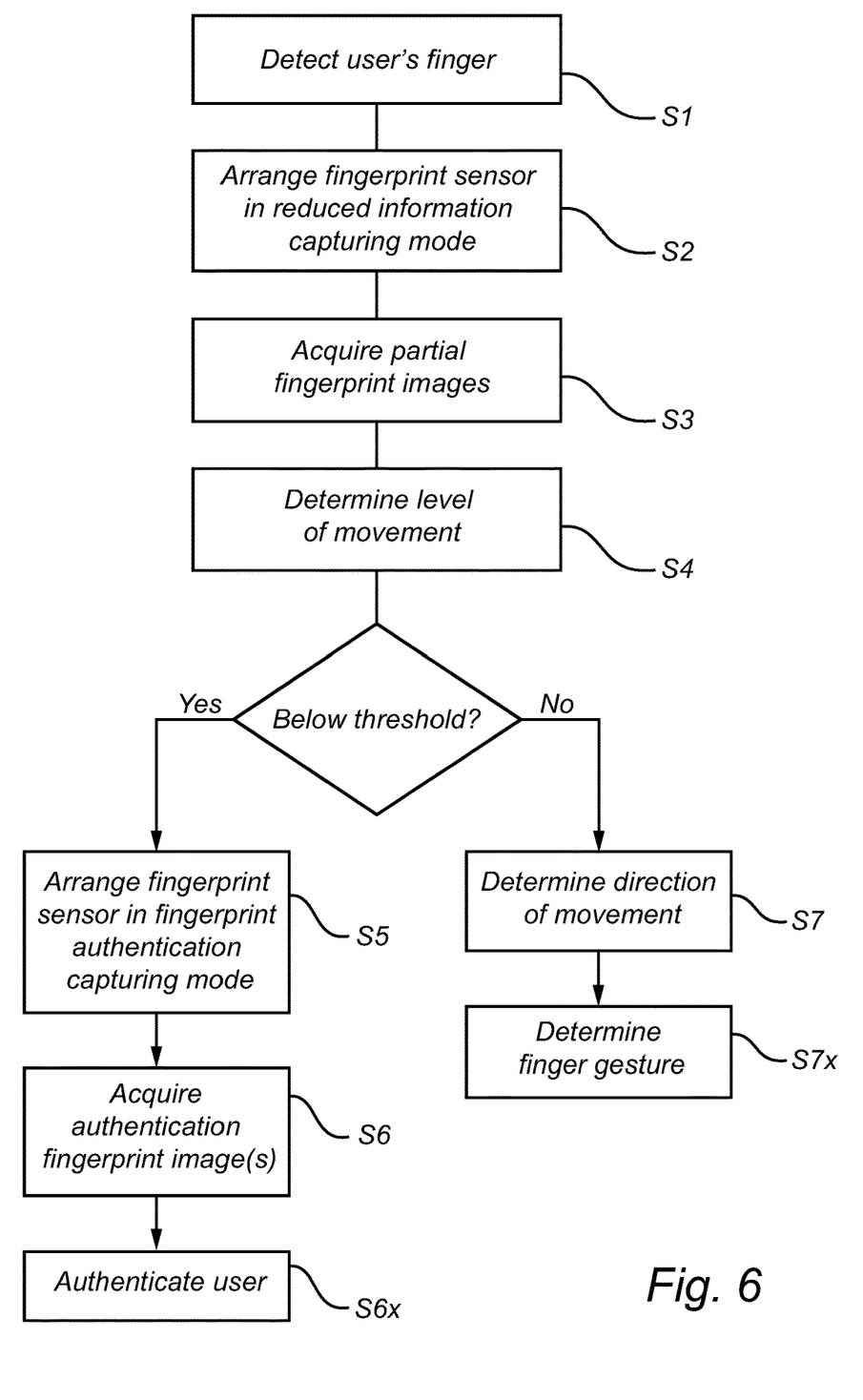
FIG. 6 is a flowchart illustrating the operation of the electronic device according to the present invention.

Turning finally to FIG. 6, which shows an exemplary general operation of the inventive electronic device, such as the mobile 100/100'. Once a user is positioning a finger on the surface of the fingerprint sensor 102, a portion of the sensing elements 202 or other means may be used for detecting, S1, that the user's finger is present at the fingerprint sensor 102. Once the finger is detected, the fingerprint sensor 102 is arranged, S2, in the reduced information capturing mode, where for example only the sensing elements 202 comprised with the sub area 204 are activated. The first and the second partial fingerprint image are subsequently consecutively acquired, S3, and a level of movement is determined S4.

As discussed above, in case the level of movement is determined to be below the predetermined threshold 402, then the fingerprint sensor 102 is arranged, S5 in the fingerprint authentication capturing mode where an essentially full fingerprint image is acquired, S6, using a majority of all of the sensing elements 202 comprised with the fingerprint sensor 102, at least 50% of the sensing elements 202. If a possible following authentication process, S6x is successful (typically comprising a comparison between fingerprint features comprising with the essentially full fingerprint image(s) and a predetermined fingerprint template), the user may be allowed to e.g. unlock the mobile phone 100, 100'

However, if the level of movement is determined to be above the predetermined threshold 402, then a direction of movement of the user's finger over the fingerprint sensor 102 is determined, S7. In a preferred embodiment the determined direction of movement may be used for determining, S7x, a finger gesture. Such a finger gesture determination may possibly be performed by comparing a movement pattern (plurality of determined direction of movement) with predetermined movement patterns stored with the electronic device 100, 100'.

In a possible embodiment and in line with the discussion provided in relation to FIG. 4, in case the determined level of movement is determined to be below the threshold and following the determination of the direction of movement (i.e. S7 and optionally S7x), it is possible to again compare the level of movement with the threshold and "loop back" to arranging the fingerprint sensor 102 in the authentication capturing mode for authenticating the user, etc.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. An electronic device, comprising:
a display unit configured to display a first graphical user interface (GUI);
a first user input device comprising a fingerprint sensor configured to capture a fingerprint image of a finger of a user, and
a control unit configured to control the operation of the fingerprint sensor, wherein the control unit is configured to:
detect the user's finger at the first user input device;
arrange, in response to the finger being detected, the fingerprint sensor in a reduced information capturing mode,
acquire, when in the reduced information capturing mode, a first and a second partial fingerprint image,
determine a sensitivity setting of the fingerprint sensor based on the first and the second partial fingerprint image, and
determine, based on the first and the second partial fingerprint image, a level of movement of the finger at the fingerprint sensor,
if the level of movement is below a predetermined threshold:
arrange the fingerprint sensor in a fingerprint authentication capturing mode,
apply the determined sensitivity setting to the fingerprint sensor, and
acquire, when in the fingerprint authentication capturing mode, a fingerprint image for allowing authentication of the user's finger, if the level of movement is above the predetermined threshold:
determine a direction of movement of the finger over the fingerprint sensor based on the first and the second partial fingerprint image.

2. The electronic device according to claim 1, wherein the fingerprint sensor is employing at least one of optical, thermal and ultrasonic sensing technology.

3. The electronic device according to claim 1, wherein the fingerprint sensor comprises at least 64×80 pixels.

4. The electronic device according to claim 1, wherein the electronic device is a mobile phone, a tablet or a laptop.

5. A method of controlling an electronic device, the electronic device comprising a display unit configured to display a first graphical user interface (GUI), a first user input device comprising a fingerprint sensor configured to capture a fingerprint image of a finger of a user, and a control unit configured to control the operation of the fingerprint sensor, wherein the method comprises:
detecting the user's finger at the first user input device;
arranging, in response to the finger being detected, the fingerprint sensor in a reduced information capturing mode;
acquiring, when in the reduced information capturing mode, a first and a second partial fingerprint image,
determining a sensitivity setting of the fingerprint sensor based on the first and the second partial fingerprint image, and
determining, based on the first and the second partial fingerprint image, a level of movement of the finger at the fingerprint sensor,
if the level of movement is below a predetermined threshold:
arranging the fingerprint sensor in a fingerprint authentication capturing mode,
applying the determined sensitivity setting to the fingerprint sensor, and
acquiring, when in the fingerprint authentication capturing mode, a fingerprint image for allowing authentication of the user's finger,
if the level of movement is above the predetermined threshold:

determining a direction of movement of the finger over the fingerprint sensor based on the first and the second partial fingerprint image.

6. The method according to claim 1, further comprising determining a finger gesture based on the determined direction.

7. The method according to claim 1, wherein when in the reduced information capturing mode a sub portion of the fingerprint sensor is arranged in a capturing mode.

8. The method according to claim 1, wherein the acquired partial fingerprint images corresponds to a sub area of the fingerprint sensor.

9. The method according to claim 1, wherein the partial fingerprint images acquired when in the reduced information capturing mode corresponds to a minor portion of the fingerprint sensor.

10. The method according to claim 9, wherein when in the reduced information capturing mode a partial fingerprint image comprising less than 50×50 pixels is acquired.

11. The method according to claim 1, wherein the fingerprint image acquired when in the fingerprint authentication capturing mode corresponds to a major portion of the fingerprint sensor.

12. The method according to claim 11, wherein when in the fingerprint authentication capturing mode a fingerprint image corresponding to a major portion of an active area of the fingerprint sensor is acquired.

13. The method according to claim 1, further comprising:
applying the determined sensitivity setting to the fingerprint sensor for acquiring, when in the reduced information capturing mode, the fingerprint image for allowing authentication of the user's finger.

14. The method according to claim 1, further comprising:
allowing user interaction with the GUI based on the determined finger gesture.

15. The method according to claim 1, further comprising, subsequent to determining the direction of movement of the finger over the fingerprint sensor:
determining if the level of movement is below the predetermined threshold;
arranging the fingerprint sensor in the fingerprint authentication capturing mode, and
acquiring, when in the fingerprint authentication capturing mode, a fingerprint image for allowing authentication of the user's finger.

* * * * *